United States Patent
Soltaniyeh et al.

(10) Patent No.: US 12,271,767 B2
(45) Date of Patent: Apr. 8, 2025

(54) NEAR-STORAGE FORMAT TRANSFORMATION

(71) Applicant: Samsung Electronics Co., Ltd., Suwon-si (KR)

(72) Inventors: Mohammadreza Soltaniyeh, Sunnyvale, CA (US); Xuebin Yao, Mountain View, CA (US); Ramdas Kachare, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/105,799

(22) Filed: Feb. 3, 2023

(65) Prior Publication Data

US 2024/0184641 A1   Jun. 6, 2024

Related U.S. Application Data

(60) Provisional application No. 63/430,017, filed on Dec. 3, 2022.

(51) Int. Cl.
*G06F 16/00* (2019.01)
*G06F 9/00* (2018.01)
(Continued)

(52) U.S. Cl.
CPC ............. *G06F 9/54* (2013.01); *G06F 9/4881* (2013.01); *G06F 9/5027* (2013.01);
(Continued)

(58) Field of Classification Search
CPC ............. G06F 11/1435; G06F 11/2089; G06F 11/3068; G06F 11/3086; G06F 16/116;
(Continued)

(56) References Cited

U.S. PATENT DOCUMENTS 6,216,125 B1 *   4/2001   Johnson .............. G06F 16/2237
705/52
6,487,549 B1 *   11/2002  Amundsen .......... G06F 16/2462
707/999.005
(Continued)

FOREIGN PATENT DOCUMENTS

WO   WO2011002777 A2 *   1/2011
WO   WO2011013125 A1 *   2/2011
(Continued)

OTHER PUBLICATIONS

Paulo R. B. Gomes et al., "Tensor-Based Methods for Blind Spatial Signature Estimation in Multidimensional Sensor Arrays", International Journal of Antennas and Propagation vol. 2017, Article ID 1615962, 2017, 11 pages.*
(Continued)

*Primary Examiner* — Srirama Channavajjala
(74) *Attorney, Agent, or Firm* — Renaissance IP Law Group LLP

(57) ABSTRACT

A device is disclosed. A receiver may receive a portion using a first data format from a source device. A transformation unit may transform the portion into a transformed portion. The transformed portion may use a second data format. A transmitter may deliver the transformed portion to a destination device.

21 Claims, 11 Drawing Sheets

(51) Int. Cl.
*G06F 9/48* (2006.01)
*G06F 9/50* (2006.01)
*G06F 9/54* (2006.01)
*G06F 16/11* (2019.01)
*G06F 16/13* (2019.01)
*G06F 16/178* (2019.01)
*G06F 16/25* (2019.01)

(52) U.S. Cl.
CPC .......... *G06F 16/116* (2019.01); *G06F 16/128* (2019.01); *G06F 16/13* (2019.01); *G06F 16/1794* (2019.01); *G06F 16/258* (2019.01)

(58) Field of Classification Search
CPC .... G06F 16/128; G06F 16/13; G06F 16/1794; G06F 16/258
See application file for complete search history.

(56) References Cited

U.S. PATENT DOCUMENTS

| | | | |
|---|---|---|---|
| 7,162,643 B1* | 1/2007 | Sankaran | H04L 69/329 370/503 |
| 8,406,096 B1* | 3/2013 | Edling | G06F 11/008 369/34.01 |
| 9,317,482 B2 | 4/2016 | Davis et al. | |
| 9,479,784 B2* | 10/2016 | Lee | H04N 19/149 |
| 10,180,928 B2 | 1/2019 | Nurvitadhi et al. | |
| 10,983,729 B2* | 4/2021 | Khan | G06F 9/34 |
| 11,010,666 B1* | 5/2021 | Terilla | G06N 20/00 |
| 11,249,969 B2* | 2/2022 | Bi | G06F 16/2264 |
| 11,347,652 B2 | 5/2022 | Youn et al. | |
| 11,392,604 B2* | 7/2022 | Kinsely | G06F 16/254 |
| 11,416,281 B2 | 8/2022 | Sankaran et al. | |
| 11,663,746 B2* | 5/2023 | Appu | H04N 19/42 382/253 |
| 2002/0059307 A1* | 5/2002 | Tomita | G06F 16/258 |
| 2005/0262110 A1* | 11/2005 | Gu | G06F 16/221 |
| 2009/0313349 A1* | 12/2009 | Jeong | H04L 63/10 709/217 |
| 2012/0151222 A1* | 6/2012 | Koifman | G06F 16/116 713/189 |
| 2014/0146648 A1* | 5/2014 | Alber | G11B 27/105 369/53.1 |
| 2014/0240591 A1 | 8/2014 | Rajagopalan et al. | |
| 2015/0067009 A1* | 3/2015 | Strauss | G06F 17/16 708/203 |
| 2017/0206017 A1* | 7/2017 | Sun | G06F 3/067 |
| 2018/0189239 A1 | 7/2018 | Nurvitadhi et al. | |
| 2021/0019280 A1 | 1/2021 | Lobo et al. | |
| 2021/0150770 A1 | 5/2021 | Appu et al. | |
| 2021/0174190 A1 | 6/2021 | Janssen et al. | |
| 2021/0326361 A1* | 10/2021 | Du | G06F 16/909 |
| 2022/0019430 A1* | 1/2022 | Sun | G06F 9/30043 |
| 2022/0050662 A1 | 2/2022 | Howard et al. | |
| 2022/0129521 A1 | 4/2022 | Surti et al. | |
| 2022/0222075 A1 | 7/2022 | Pawlowski et al. | |
| 2023/0085023 A1* | 3/2023 | Possee | G01V 1/282 702/68 |
| 2023/0196186 A1* | 6/2023 | Rijnders | G06N 20/00 706/12 |

FOREIGN PATENT DOCUMENTS

| | | | |
|---|---|---|---|
| WO | WO2016118979 A2 * | 7/2016 | |
| WO | WO2018098429 A1 * | 5/2018 | |

OTHER PUBLICATIONS

Jie Liu et al., "UniSparse: An Intermediate Language for General Sparse Format Customization", Proceedings of the ACM on Programming Languages, vol. 8, Issue OOPSLA1 Article No. 99, pp. 137-165.*

Yanfeng Sun et al., "Dimensionality reduction assisted tensor clustering", 2014 International Joint Conference on Neural Networks (IJCNN) (2014, pp. 1565-1572).*

Dave, Shail et al., "Hardware Acceleration of Sparse and Irregular Tensor Computations of ML Models: A Survey and Insights" Proceedings of the IEEE, vol. 109, No. 10, 2021, 44 pages.

European Extended Search Report for Application No. 23210833.2, mailed Mar. 22, 2024.

* cited by examiner

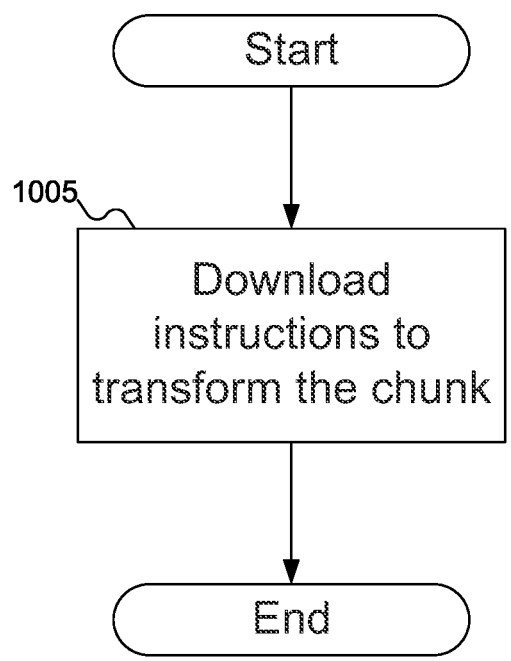
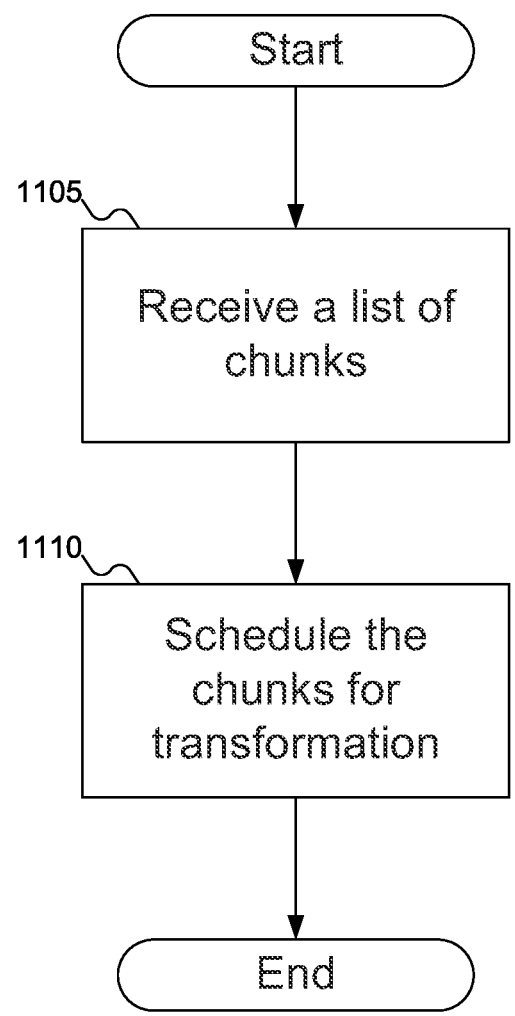
FIG. 10
FIG. 11

NEAR-STORAGE FORMAT TRANSFORMATION

RELATED APPLICATION DATA

This application claims the benefit of U.S. Provisional Patent Application Ser. No. 63/430,017, filed Dec. 3, 2022, which is incorporated by reference herein for all purposes.

FIELD

The disclosure relates generally to storage devices, and more particularly to performing transformations on sparse data.

BACKGROUND

As storage device capacities increase, so too does the data stored on those storage devices. Applications are storing ever-larger datasets. In some cases, the datasets may be sparse: relatively little meaningful data may be stored relative to the size of the dataset. For example, if the data is stored in a tabular or matrix format, most of the data may be stored as zeroes. The meaningful data—the data that are not zeros—may be relatively few entries as compared with the number of zero entries.

There may be many different ways to store a sparse dataset to reduce its size. Which sparse data format is best may depend on the dataset itself. In addition, applications to process the datasets may expect the data to be stored in particular sparse data formats.

A need remains to improve the management of sparse data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 10 shows a flowchart of an example procedure for using the sparse transformation circuit of FIG. 1 to receive instructions for transforming a chunk of FIG. 7, according to embodiments of the disclosure.

FIG. 11 shows a flowchart of an example procedure for the sparse transformation circuit of FIG. 1 to schedule the chunks of FIG. 7 for transformation, according to embodiments of the disclosure.

SUMMARY

Figure 1:
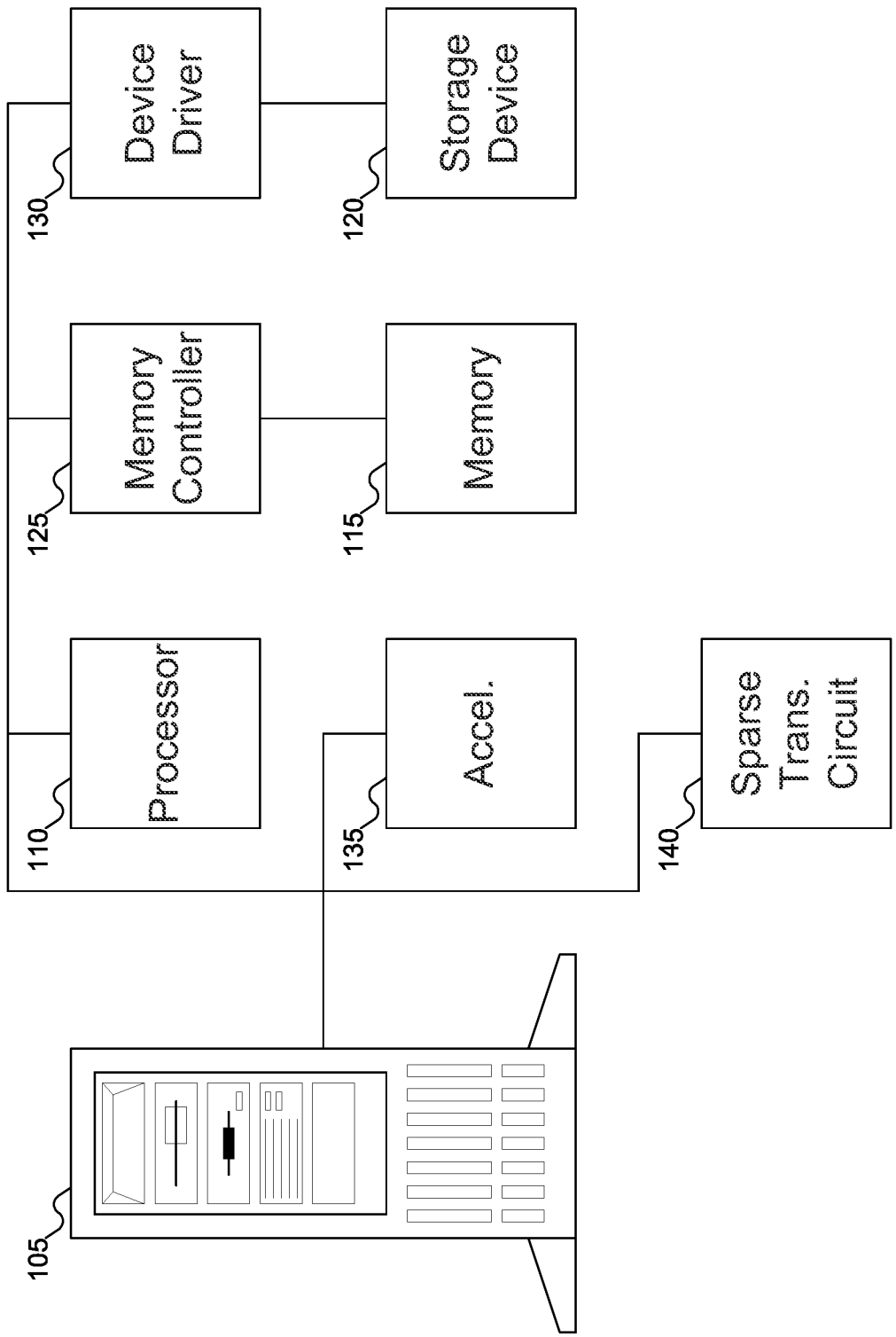
FIG. 1 shows a machine including a sparse transformation circuit to support transformation between data in different formats, according to embodiments of the disclosure.

Embodiments of the disclosure include a transformation circuit. The transformation circuit may receive chunks of data to transform from one data format to another. The transformation circuit may then provide the transformed chunks to another device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Sparse data may be data that has relatively few non-zero values compared with the total number of values in the data. Storing the full data in an uncompressed format may be inefficient, requiring relatively more space on a storage device than the non-zero values themselves might require. A sparse data format may be used to store the sparse data in a more compact manner, reducing the amount of storage required for the data.

But there might not be a single optimal sparse data format. That is, one dataset might be stored most compactly using one sparse data format, whereas another dataset might be stored most compactly using a different sparse data format. Which sparse data format is optimal may depend on the data itself: whether the non-zero values are evenly distributed across the dataset or not, how many values are non-zero, and other factors may be relevant to selecting an optimal sparse data format for a particular dataset.

In addition, as storage systems become heterogeneous, different storage devices may support storing data using different sparse data formats. The optimal sparse data format for storing a particular dataset on one storage device might be different from the optimal sparse data format for another storage device.

Further, applications that may use the sparse data might expect the data to be stored using a particular sparse data format. If the sparse data format used by the storage device is different from the sparse data format the application expects, the host processor might have to load the data into main memory, transform the data from the sparse data format used to store the data on the storage device into the sparse data format the application is expecting, then provide the transformed data to the application. Even if the application is running on the host processor, the application may have to wait until the host processor finishes transforming the data before the application may begin to process the data. And if the application is offloaded from the host processor (for example, the application is running on an accelerator, a computational storage unit, or on the controller of the storage device), the application may be subject to additional delays due to transferring the data to and from main memory.

Embodiments of the disclosure address these problems by supporting near-data sparse transformation. The near-data sparse transformation may access the sparse data from the storage device, without first loading the sparse data into main memory. The near-data sparse transformation may support any desired sparse data storage format and any desired sparse data application format, transforming the data from the sparse format used to store the data into a sparse format used by the application. If the near-data sparse transformation does not already support the sparse data storage format or the sparse data application format, instructions may be loaded into the near-data sparse transformation to support the desired transformation. The near-data sparse transformation may be independent of the storage device storing the sparse data.

Embodiments of the disclosure may also support parallel sparse transformation of the sparse data. Two or more sparse transformation units may process different sparse data in parallel, expediting overall data transformation.

Embodiments of the disclosure may also support the application beginning its operations before all the sparse data has been transformed. The data may be divided into chunks, each of which may be sparsely transformed independently. When one chunk has been transformed, the application may begin processing that transformed chunk while the near-data sparse transformation may process another chunk.

FIG. 1 shows a machine including a sparse transformation circuit to support transformation between data in different formats, according to embodiments of the disclosure. In FIG. 1, machine 105, which may also be termed a host or a system, may include processor 110, memory 115, and storage device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115.

Storage device 120 may be used to store data that may be termed "long-term": that is, data that is expected to be stored for longer periods of time, or that does not need to be stored in memory 115. Storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Machine 105 may also accelerator 135. Accelerator 135 may be any desired component that may provide for execution of particular operations, but that may be offloaded from processor 110. For example, accelerator 135 may support near-data processing, where the processing of the data may happen closer to storage device 120 and without transferring the data into memory 115. Or, accelerator 135 may be a computational storage unit, which may also be termed a computational storage device or a computational device, which may support local execution of instructions away from processor 110.

Accelerator 135 may be implemented using any desired hardware. For example, accelerator 135 may be implemented using a Field Programmable Gate Array (FPGA), an Application-Specific Integrated Circuit (ASIC), a central processing unit (CPU), a System-on-a-Chip (SoC), a graphics processing unit (GPU), a general purpose GPU (GPGPU), a data processing unit (DPU), a neural processing unit (NPU), a Network Interface Card (NIC), or a tensor processing unit (TPU), to name a few possibilities. Accelerator 135 may also use a combination of these elements to implement accelerator 135.

In some situations, the data to be stored on storage device 120 (or in memory 115) may be sparse data. Sparse data may be data that has relatively few non-zero values relative to the size of the data. (What "relatively few" may mean may depend on the data in question, the format used to store the data, or other factors.) Sparse data may be stored in a vector format (a one-dimensional array), matrix format (a two-dimensional array), or a tensor format (a multi-dimensional array).

There are various data formats that may be used to store sparse data. Examples of formats used to store spare data may include Dictionary of Keys (DOK), List of Lists (LIL), Coordinate List (COO), Compressed Sparse Row (CSR), or Compressed Sparse Column (CSC). Some sparse data formats are designed for efficient data storage, efficient data modification, or efficient access and matrix operations. What storage format is best for storing the data efficiently on storage device 120 might not be the best format for accelerator 135 to perform operations on the data.

In some situations, storage device 120 may store the data in one format for storage efficiency, and accelerator 135 may expect the data in another format for operational efficiency. In such situations, the data may be transformed from one storage format to another storage format, to support both storage device 120 and accelerator 135.

While processor 110 might be able to transform data from one storage format to another, there are other considerations. First, because the data may be large, it may take a relatively large amount of time to transfer the data from storage device 120 to memory 115 for processor 110 to transform the data. In addition, transferring the data from storage device 120 to memory 115 may involve evicting other data from memory 115 to make room for the data to be transformed.

Accelerator 135 may wait until processor 110 completes the transformation, delaying operations. Further, while processor 110 is transforming the data, processor 110 may be unable to carry out other operations, which may be delayed accordingly.

Embodiments of the disclosure address these concerns using sparse transformation circuit 140. Sparse transformation circuit 140, which may also be called a device, may perform the transformation of data from one data format to another to support use of the data by both storage device 120 and accelerator 135. Sparse transformation circuit 140 may provide data to accelerator 135 as data is being transformed, which may reduce or eliminate any delay while accelerator 135 waits for the data to be transformed. By taking responsibility for transforming the data, sparse transformation circuit 140 may reduce the load on processor 110.

Sparse transformation circuit 140 may be implemented using any desired hardware. For example, sparse transformation circuit 140 may be implemented using an FPGA, an ASIC, a CPU, an SoC, a GPU, a GPGPU, a DPU, an NPU, an NIC, or a TPU, to name a few possibilities. Sparse transformation circuit 140 may also use a combination of these elements to implement sparse transformation circuit 140. Sparse transformation circuit 140 may also be implemented as part of another component: for example, storage device 120, accelerator 135, or a computational storage unit. If sparse transformation circuit 140 is implemented as part of storage device 120, accelerator 135, or some other component, the function of sparse transformation circuit 140 may be implemented as software utilizing the hardware of storage device 120, accelerator 135, or the other component.

While FIG. 1 shows device driver 130, which is described above as supporting access to storage device 120, machine 105 may also include device drivers (not shown) for accelerator 135 and/or sparse transformation circuit 140. That is, embodiments of the disclosure may include device driver 130 supporting any or all of storage device 120, accelerator 135 or sparse transformation circuit 140, and embodiments of the disclosure may include additional device drivers to support any or all combinations of these components.

In some embodiments of the disclosure, device driver 130 (and other device drivers, such as to support accelerator 135 and/or sparse transformation circuit 140) may provide application programming interfaces (APIs) to access storage device 120, accelerator 135 and/or sparse transformation circuit 140.

Embodiments of the disclosure may include any desired mechanism to communicate with storage device 120 accelerator 135, and/or sparse computational circuit 140. For example, storage device 120 accelerator 135, and/or sparse computational circuit 140 may connect to one or more busses, such as a Peripheral Component Interconnect Express (PCIe) bus, or storage device 120 accelerator 135, and/or sparse computational circuit 140 may include Ethernet interfaces or some other network interface. Other potential interfaces and/or protocols to storage device 120 and/or computational device 140 may include NVMe, NVMe over Fabrics (NVMe-oF), Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), and Serial AT Attachment (SATA), among other possibilities.

Figure 2:
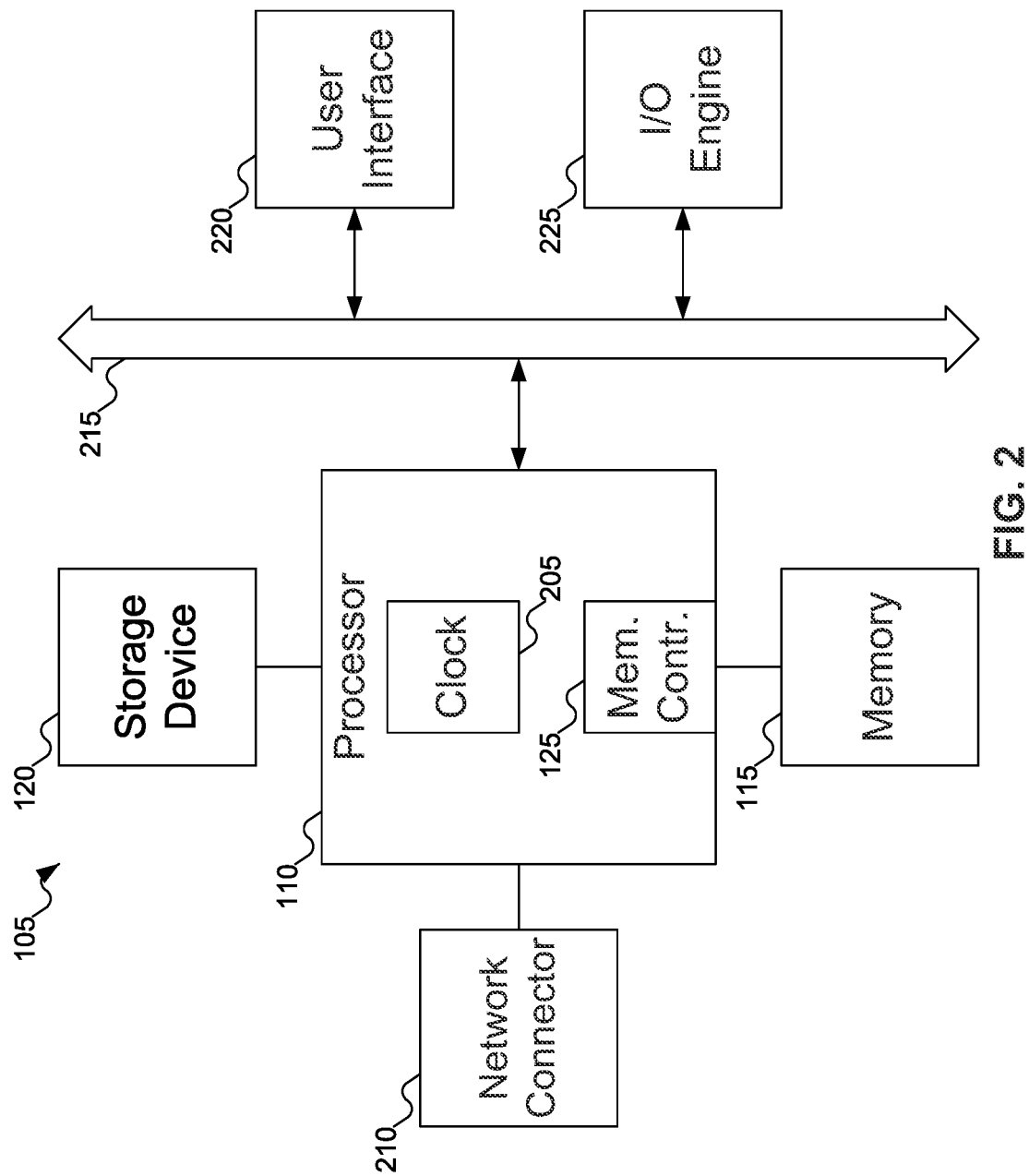
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
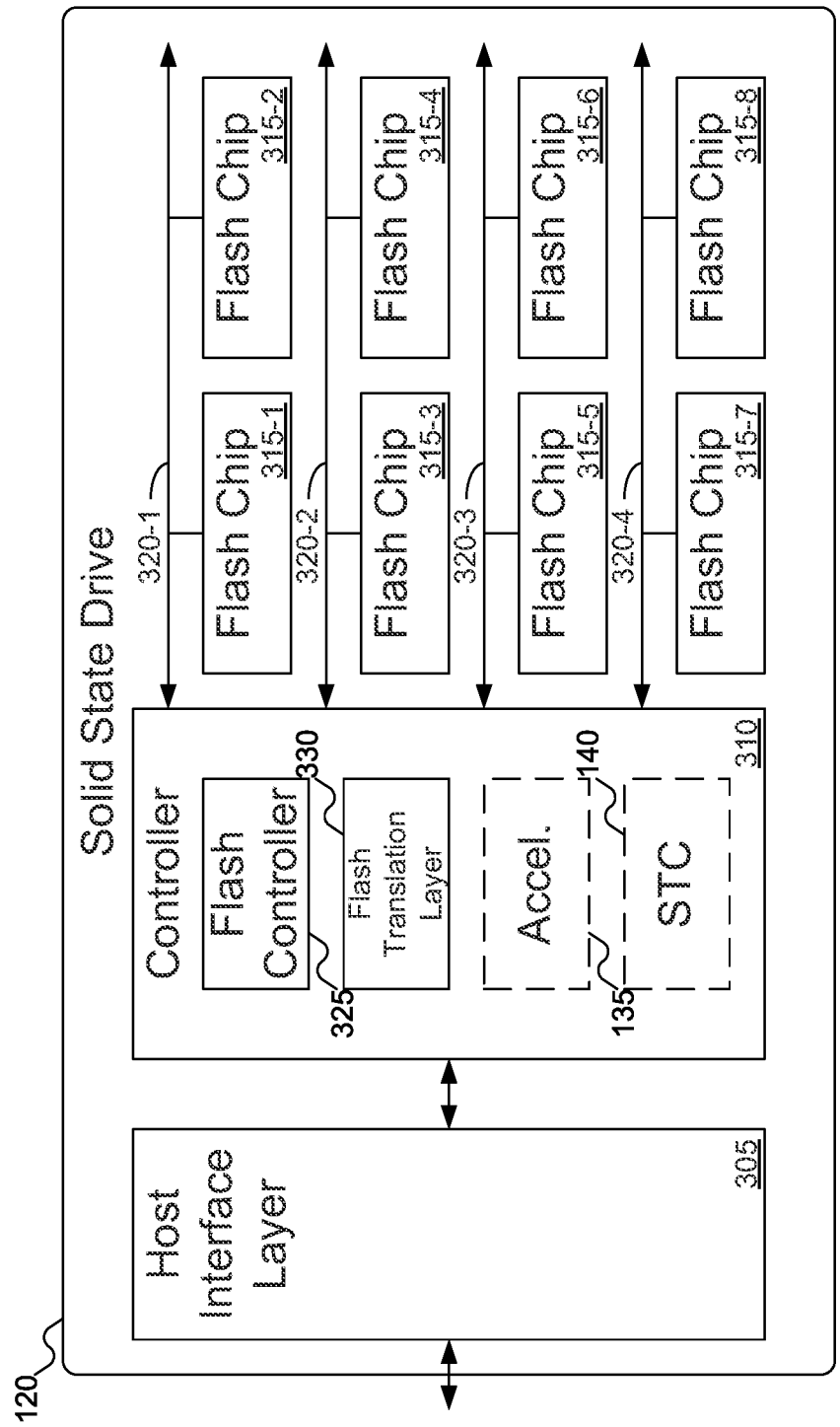
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include host interface layer (HIL) 305, controller 310, and various flash memory chips 315-1 through 315-8 (also termed "flash memory storage"), which may be organized into various channels 320-1 through 320-4. Host interface layer 305 may manage communications between storage device 120 and other components (such as processor 110 of FIG. 1). Host interface layer 305 may also manage communications with devices remote from storage device 120: for example, sparse transformation circuit 140 (when not implemented as part of storage device 120). Communications with remote device may be handled, for example, over one or more network connections. These communications may include read requests to read data from storage device 120, write requests to write data to storage device 120, and delete requests to delete data from storage device 120.

Host interface layer 305 may manage an interface across only a single port, or it may manage interfaces across multiple ports. Alternatively, storage device 120 may include multiple ports, each of which may have a separate host interface layer 305 to manage interfaces across that port. Embodiments of the inventive concept may also mix the possibilities (for example, an SSD with three ports might have one host interface layer to manage one port and a second host interface layer to manage the other two ports).

Controller 310 may manage the read and write operations, along with garbage collection and other operations, on flash memory chips 315-1 through 315-8 using flash memory controller 325. SSD controller 310 may also include flash translation layer 330, which may manage the mapping of logical block addresses (LBAs) (as used by host 105 of FIG. 1) to physical block addresses (PBAs) where the data is actually stored on storage device 120. By using flash translation layer 330, host 105 of FIG. 1 does not need to be informed when data is moved from one block to another within storage device 120.

In some embodiments of the disclosure, accelerator 135 and/or sparse transformation circuit 140 may be implemented as part of storage device 120: for example, as part of controller 310 (as shown in FIG. 3). The functions performed by accelerator 135 and/or sparse transformation circuit 140 may be the same whether implemented as part of storage device 120 or not. Accelerator 135 and sparse transformation circuit 140 are shown with dashed lines to indicate that they may be omitted from storage device 120 in some embodiments of the disclosure.

While FIG. 3 shows storage device 120 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a SSD, other storage devices (for example, hard disk drives) may be implemented using a different structure from that shown in FIG. 3 to manage reading and writing data, but with similar potential benefits.

Figure 4:
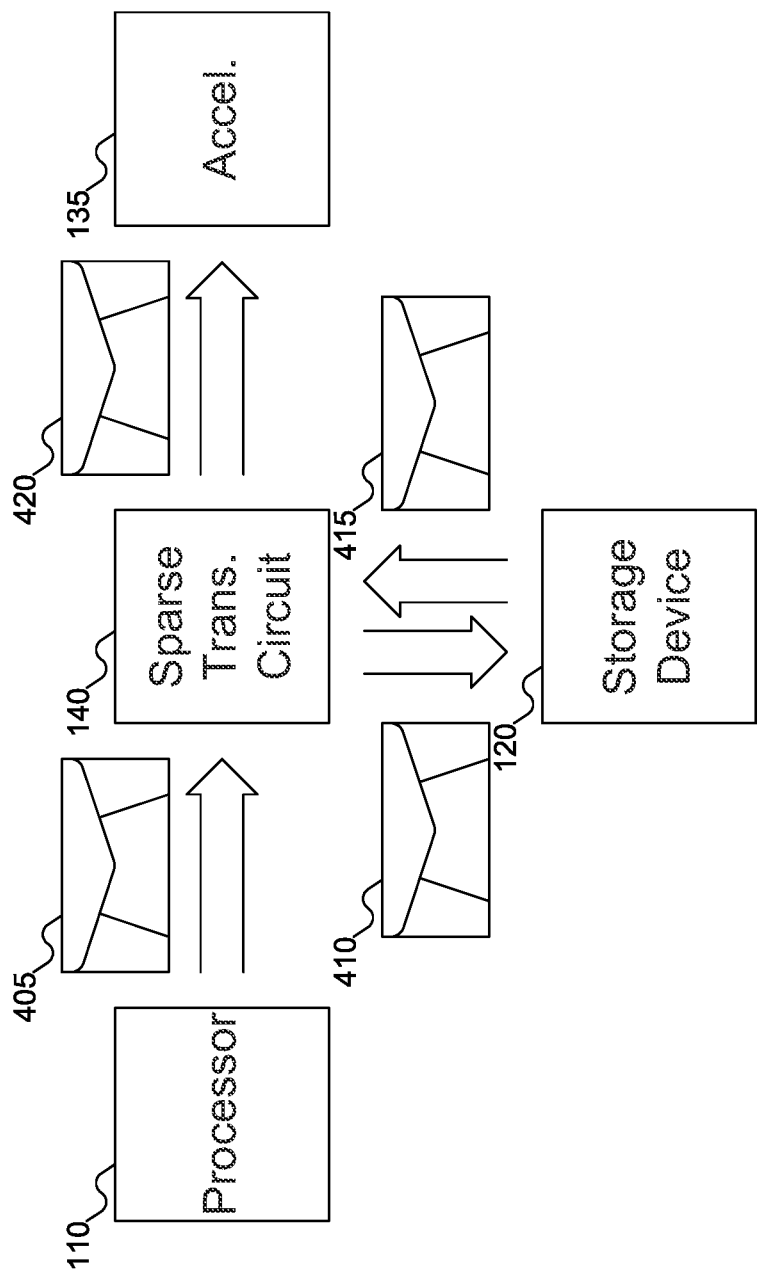
FIG. 4 shows messages between the processor of FIG. 1, the sparse transformation circuit of FIG. 1, the storage device of FIG. 1, and the accelerator of FIG. 1, according to embodiments of the disclosure.

FIG. 4 shows messages between processor 110 of FIG. 1, sparse transformation circuit 140 of FIG. 1, storage device 120 of FIG. 1, and accelerator 135 of FIG. 1, according to embodiments of the disclosure. In FIG. 4, processor 110 may send request 405 to sparse transformation circuit 140, asking sparse transformation circuit 140 to convert data on storage device 120 (stored in one sparse data format) to another sparse data format for accelerator 135. Sparse transformation circuit 140 may then send request 410 to storage device 120, asking storage device 120 to read the data to be transformed. Storage device 120 may respond with reply 415, including the data as stored on storage device 120. Sparse transformation circuit 140 may then transform the data into the appropriate sparse data format, and may provide the transformed data to accelerator 135 as message 420.

There are some points worth noting about FIG. 4. First, while FIG. 4 shows processor 110 sending request 405 to sparse transformation circuit 140, some embodiments of the disclosure might have processor 110 send a request to storage device 120 to read the data, and might then provide the data directly to sparse transformation circuit 140 (rather than having sparse transformation circuit 140 request the data from storage device 120. In other embodiments of the disclosure, processor 110 might not send request 405 to sparse transformation circuit 140, but instead might send a request to storage device 120 to provide the data to sparse transformation circuit 140 for transformation (and eventual delivery to accelerator 135). In still other embodiments of the disclosure, processor 110 might not send request 405 to sparse transformation circuit 140, but instead might send a request to accelerator 135 to process the data: accelerator 135 might then ask sparse transformation circuit 140 to retrieve and transform the data, or accelerator 135 might request the data from storage device 120 (and leave it to storage device 120 to request that sparse transformation circuit 140 transform the data appropriately). In still other embodiments, rather than providing the data to accelerator 135, sparse transformation circuit 140 might return the transformed data to processor 110 (for example, if sparse transformation circuit 140 does not communicate with accelerator 135, or if processor 110 has other uses for the data that do not involve accelerator 135). In still other embodiments, the data might not be stored on storage device 120, but might be provided by processor 110 or accelerator 135, and might be delivered to any of processor 110, storage device 120, or accelerator 135. Embodiments of the disclosure are intended to cover all variations of how sparse transformation circuit 140 might be requested to transform data, regardless of which component asks sparse transformation circuit 140 to transform the data or where the data is ultimately delivered.

Figure 5:
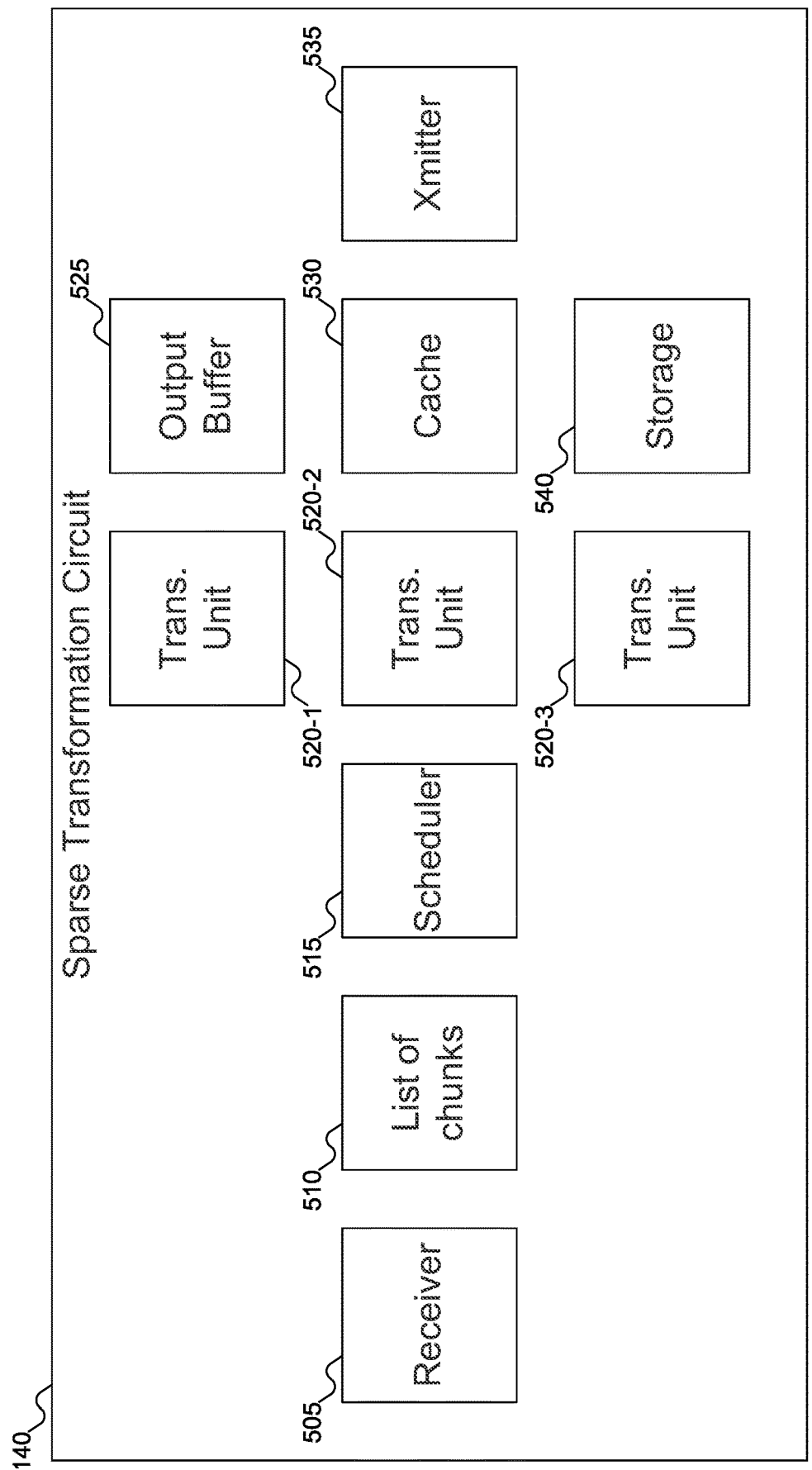
FIG. 5 shows details of the sparse transformation circuit of FIG. 1, according to embodiments of the disclosure.

FIG. 5 shows details of sparse transformation circuit 140 of FIG. 1, according to embodiments of the disclosure. In FIG. 5, sparse transformation circuit 140 includes various components.

Receiver 505 may receive list of chunks 510. List of chunks 510 may identify what chunks of data to transform from one data format to another. A chunk of data may be considered some portion of data, and any desired unit size may be used. Receiver 505 may receive list of chunks 510 from processor 110 of FIG. 1, storage device 120 of FIG. 1, accelerator 135 of FIG. 1, or any other desired source (or source device).

In some embodiments of the disclosure, sparse transformation circuit 140 may retrieve the chunks in list of chunks 510 from storage device 120 of FIG. 1. In other embodiments of the disclosure, receiver 505 may receive the chunks in list of chunks 510 may be received from any source, such as processor 110 of FIG. 1, storage device 120 of FIG. 1, or accelerator 135 of FIG. 1.

Scheduler 515 may take list of chunks 510 and schedule the individual chunks for transformation using transformation units 520-1, 520-2, or 520-3 (which may be referred to collectively as transformation units 520). While FIG. 5 shows sparse transformation circuit 140 as including three transformation units 520, embodiments of the disclosure may include any number (one or more) of transformation units 520.

Scheduler 515 may operate in any desired manner to schedule transformation of the chunks. In some embodiments of the disclosure, scheduler 515 may assign chunks in the order listed in list of chunks 510 to transformation units 520 as transformation units 520 become available. In other embodiments of the disclosure, scheduler 515 may assign the chunks from list of chunks 510 to transformation units 520 in any desired manner, even if sparse transformation circuit 140 ends up producing transformed chunks in a different order than list of chunks 510.

Transformation units 520 may process an individual chunk, and may transform the chunk from its original data format to another data format. For example, transformation units 520 might transform a chunk from COO format to CSC format. The original data format may be determined from where the chunk originates, and the target data format may be specified as part of request 405 of FIG. 4 to transform the chunks. For example, storage device 120 of FIG. 1 may be queried to determine that the chunks are stored in COO format, and the request to transform the chunks may specify that the chunks should be transformed to CSC format (which may be the format expected by, for example, accelerator 135 of FIG. 1). Sparse transformation circuit 140 may determine the original data format and the target data format in any desired manner: querying storage device 120 of FIG. 1 and/or receiving the target data format as part of request 405 of FIG. 4 are merely example approaches that may be used. Other approaches may include, for example, receiving the original data format as part of request 405 of FIG. 4, or querying accelerator 135 of FIG. 1 for the format in which accelerator 135 of FIG. 1 expects the chunks to be.

Transformation units 520 may operate in any desired manner. In some embodiments of the disclosure, transformation units 520 may transform the data (using various instructions) from the original data format to the target data format. In other embodiments of the disclosure, transformation units 520 may transform the data (using various instructions) from the original data format into an intermediary data format, and from the intermediary data format to the target data format.

Transformation units 520 may include their own memories (not shown in FIG. 5) for storing a chunk of data, and may transform the chunk of data from the original data format to the target data format in that memory. But in some embodiments of the disclosure, sparse transformation circuit 140 may include a shared memory (not shown in FIG. 5) that transformation units 520 may use to transform individual chunks from the original data format to the target data format.

Sparse transformation circuit 140 may also support virtual pipelining. In some embodiments of the disclosure, performing a sparse transformation might involve multiple steps. While individual transformation units may be designed to carry out all the steps necessary to transform a chunk of data, the transformation process may be divided among multiple transformation units. That is, different transformation units 520 may perform different parts of the overall transformation process.

Consider, for example, a transformation process that involves transforming a chunk of data from an input format into an intermediary format, and from the intermediary format into an output format. One transformation unit may handle the transformation from the input format to the intermediary format, and another transformation unit may handle the transformation from the intermediary format to the output format.

Where different transformation units 520 may perform different steps in a transformation of a chunk of data, scheduler 515 may schedule a chunk to be processed by different transformation units 520 to achieve the overall operation. Thus, instead of each transformation unit 520 operating independently, transformation units 520 (or a subset thereof) may operate as a pipeline, each operating on data that is passed between transformation units 520 or stored in a shared memory. Scheduler 515 may thus turn transformation units 520 (or a subset thereof) into a virtual pipeline by scheduling a chunk of data for processing by different transformation units in sequence, until the chunk of data is completely transformed (after which the data may be stored in output buffer 525 or cache 530, as described below).

After transformation, the transformed chunk may be stored in output buffer 525 or cache 530. Output buffer 525 may be a temporary storage for the transformed chunk until it may be delivered to the appropriate target. Cache 530 may function similarly, except that the transformed chunk may also be kept in cache 530. In embodiments of the disclosure including cache 530, upon receipt of a chunk to transform, sparse transformation circuit 140 may check to see the corresponding transformed chunk is already in cache 530. If the corresponding transformed chunk is already in cache 530, then sparse transformation circuit 140 may simply use the transformed chunk as stored in cache 530, rather than performing another transformation of the original chunk. Note that cache 530 may also function as output buffer 525: embodiments of the disclosure might not include both output buffer 525 and cache 530.

Once transformation units 520 have generated the transformed chunk, then transmitter 535 may transmit the transformed chunk to the appropriate destination (or destination device), be it processor 110 of FIG. 1, storage device 120 of FIG. 1, accelerator 135 of FIG. 1, or some other target.

Sparse transformation circuit 140 may also include storage 540. Storage 540 may store instructions for how sparse transformation circuit 140 may transform a chunk from one data format to another. In some embodiments of the disclosure, storage 540 may store pre-installed instructions for one or more data transformations; in other embodiments of the disclosure, storage 540 may be used to store instructions downloaded from processor 110 of FIG. 1 and/or accelerator 135 of FIG. 1, which may specify how to generate the desired transformed data. In still other embodiments of the disclosure, storage 540 may store pre-installed instructions for data transformation as well as support downloading instructions from processor 110 of FIG. 1 and/or accelerator 135 of FIG. 1 for specific data transformations not necessarily supported by the pre-installed instructions.

Figure 6:
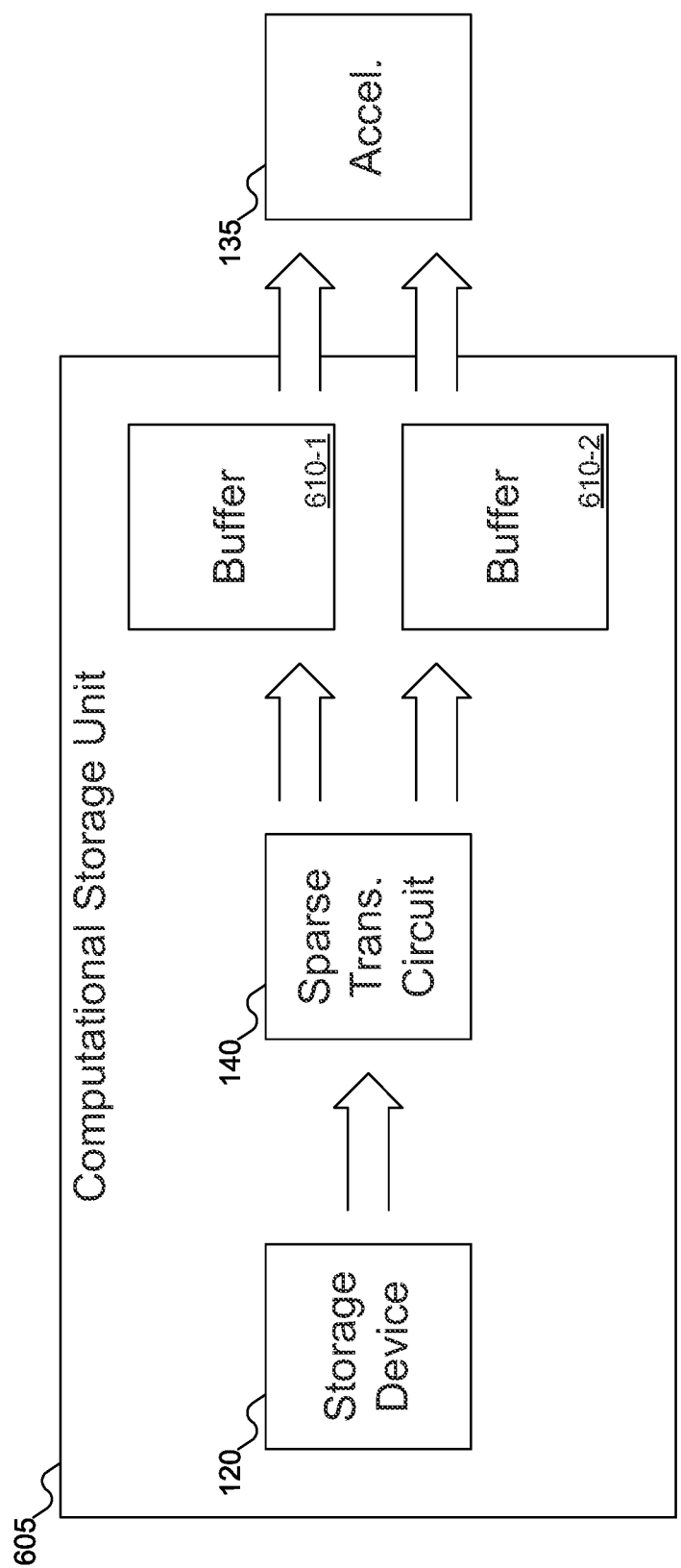
FIG. 6 shows the sparse transformation circuit of FIG. 1 communicating with the accelerator of FIG. 1 using two buffers, according to embodiments of the disclosure.

FIG. 6 shows sparse transformation circuit 140 of FIG. 1 communicating with accelerator 135 of FIG. 1 using two buffers, according to embodiments of the disclosure. In FIG. 6, sparse transformation circuit 140 is shown as part of computational storage unit 605, which also may include storage device 120. Computational storage unit 605 may thus combine storage device 120 and sparse transformation circuit 140 in a single unit: sparse transformation circuit 140 may retrieve data from storage device 120 (or may have chunks provided to it by storage device 120).

Computational storage unit 605 may also include buffers 610-1 and 610-2 (which may be referred to collectively as buffers 610). Sparse transformation circuit 140 may store transformed chunks into buffers 610: accelerator 135 may then read the transformed chunks from buffers 610 alternately. Buffers 610 may be viewed as ping pong buffers: when accelerator 135 is reading data from buffer 610-1, sparse transformation circuit 140 may be storing data into buffer 610-2, and vice versa. Embodiments of the disclosure that support sparse transformation circuit 140 and accelerator 135 both accessing a buffer (be it buffers 610, output buffer 525 of FIG. 5, or cache 530 of FIG. 5) may enable faster processing of the data, as accelerator 135 may be processing one (transformed) chunk of data while sparse transformation circuit 140 is transforming the next chunk.

In some situations, the data may include a relatively uniform distribution of the non-zero data across the entire dataset. Put another way, given any number of "rows" from the overall dataset (with "row" being of variable meaning depending on the dimensionality of the dataset), it may be expected that the number of non-zero values in the rows may be roughly the same, statistically. Such datasets may support division into uniform-sized chunks.

Figure 7A:
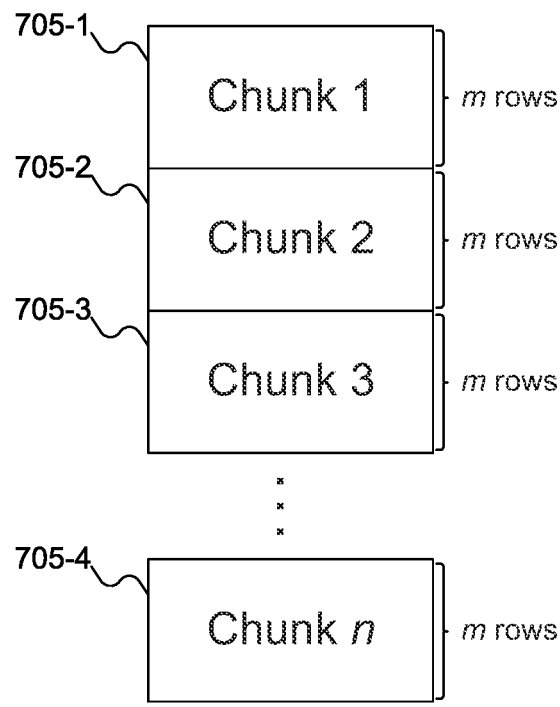
FIG. 7A shows data that may be divided into chunks of fixed size for processing by the sparse transformation circuit of FIG. 1, according to embodiments of the disclosure.

FIG. 7A shows data that may be divided into chunks of fixed size for processing by sparse transformation circuit 140 of FIG. 1, according to embodiments of the disclosure. In FIG. 7A, the dataset is shown as divided into chunks 705-1 through 705-4 (which may be referred to collectively as chunks 705). Each chunk 705 may include some number of rows (shown as m rows in FIG. 7A): the value of m may be constant across chunks 705.

In other situations, the non-zero values may be not be uniformly distributed across the dataset. For example, one set of m rows might include a high number of non-zero values, whereas another set of m rows might include a relatively low number of non-zero values (the "high number" and "low number" being relative to an expected number of non-zero values given the proportion of non-zero values in the overall dataset). In such situations, using uniformly sized chunks (of, for example, m rows) might result in chunks with significantly different numbers of non-zero values. Since the number of non-zero values in a chunk might impact the time required to transform the chunk from one data format to another, using variable sized chunks may enable a more balanced transformation time per chunk.

Figure 7B:
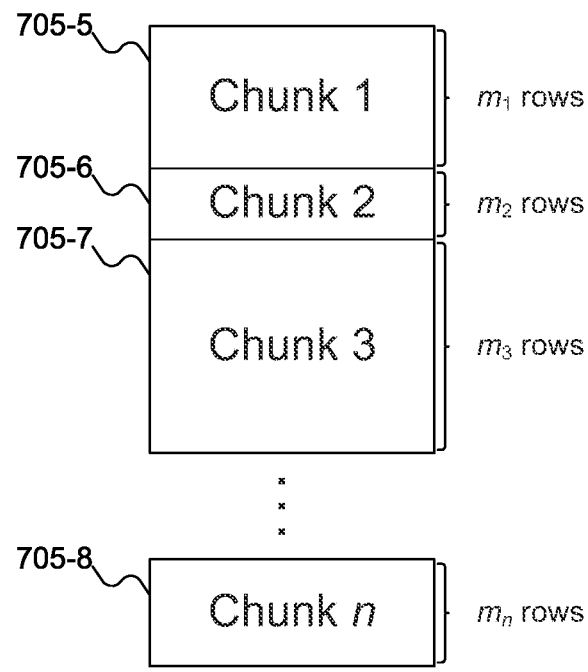
FIG. 7B shows data that may be divided into chunks of variable size for processing by the sparse transformation circuit of FIG. 1, according to embodiments of the disclosure.

FIG. 7B shows data that may be divided into chunks of variable size for processing by sparse transformation circuit 140 of FIG. 1, according to embodiments of the disclosure. In FIG. 7B, chunks 705-5 through 705-8 are shown. As may be seen, each chunk 705-5 through 705-8 may include different numbers of rows ($m_1$ through $m_n$). By having chunks 705-5 through 705-8 have variable numbers of rows (but hopefully relatively equal numbers of non-zero values), the time required to transform chunks 705-5 through 705-8 may still be relatively equal.

Figure 8:
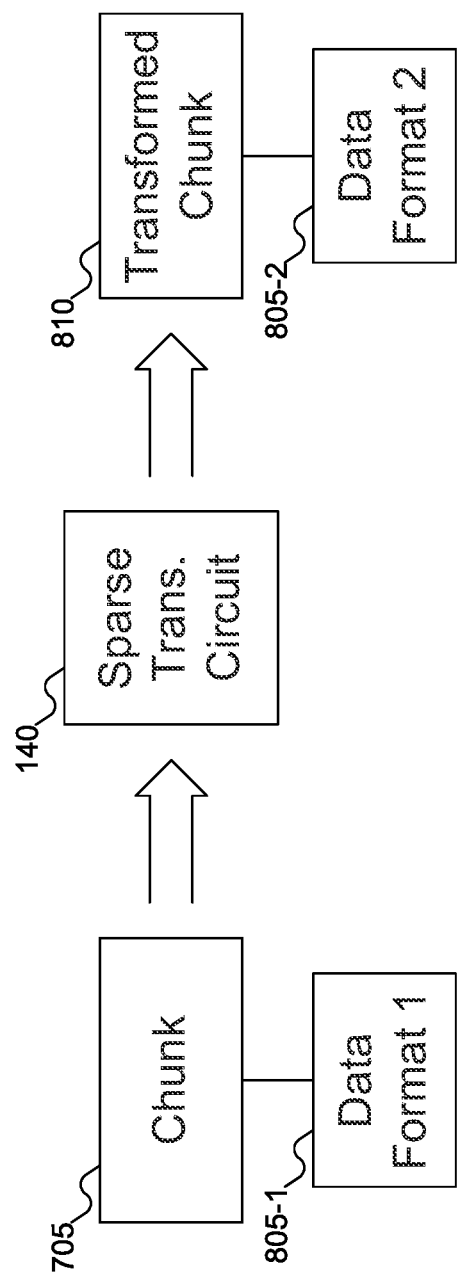
FIG. 8 shows the sparse transformation circuit of FIG. 1 converting a chunk of FIGS. 7A-7B in one data format to a transformed chunk in another data format, according to embodiments of the disclosure.

FIG. 8 shows sparse transformation circuit 140 of FIG. 1 converting chunk 705 of FIGS. 7A-7B in one data format to a transformed chunk in another data format, according to embodiments of the disclosure. In FIG. 8, sparse transformation circuit 140 may receive (or retrieve) chunk 705. Chunk 705 may be in data format 805-1. Sparse transformation circuit 140 may then transform chunk 705 into chunk 810, using data format 805-2. (Data formats 805-1 and 805-2 may be referred to collectively as data formats 805.) Note that the data in chunk 705 and transformed chunk 810 may be the same: only the representation of the data in chunk 705 and transformed chunk 810 may have changed.

Figure 9:
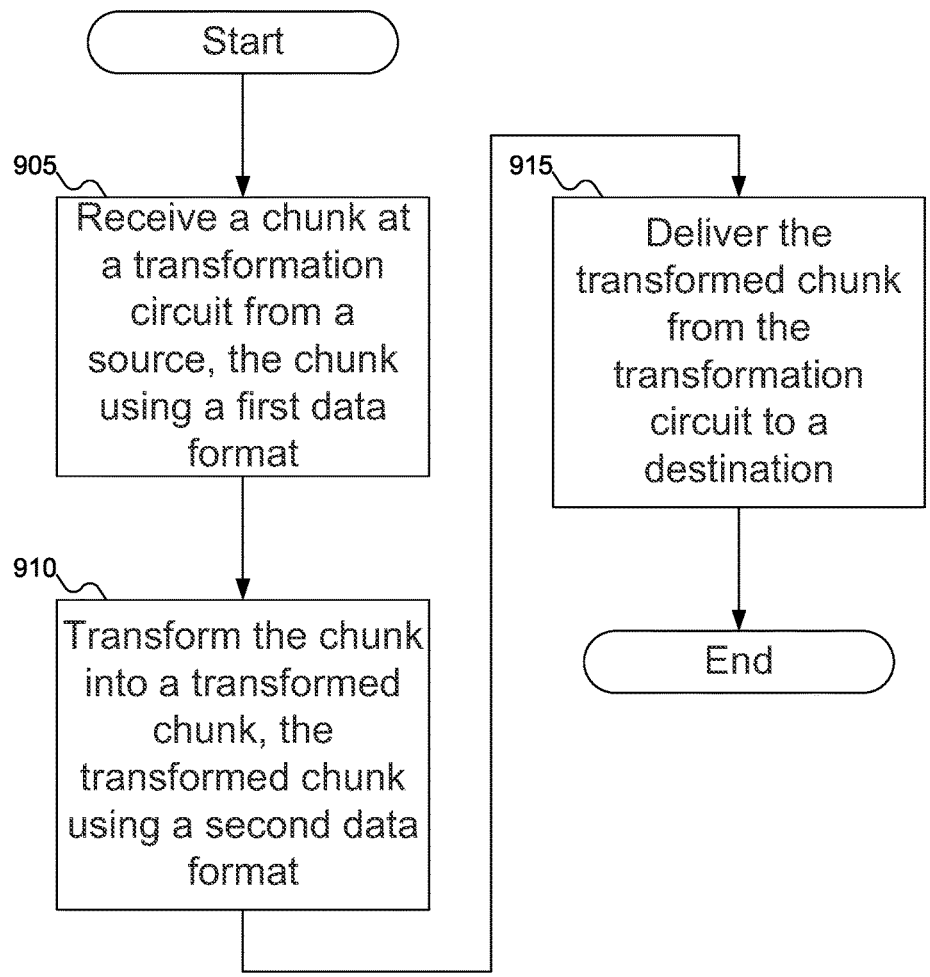
FIG. 9 shows a flowchart of an example procedure for using the sparse transformation circuit of FIG. 1 to transform data from one data format into another data format, according to embodiments of the disclosure.

FIG. 9 shows a flowchart of an example procedure for using sparse transformation circuit 140 of FIG. 1 to transform data from one data format 805 of FIG. 8 into another data format 805 of FIG. 8, according to embodiments of the disclosure. In FIG. 9, at block 905, sparse transformation circuit 140 of FIG. 1 may receive chunk 705 of FIG. 7 from a source. The source may be, for example, processor 110 of FIG. 1, storage device 120 of FIG. 1, or accelerator 135 of FIG. 1, among various possibilities. Chunk 705 of FIG. 7 may be in first data format 805-1 of FIG. 1.

At block 910, sparse transformation circuit 140 of FIG. 1 may transform chunk 705 of FIG. 7 to transformed chunk 810 of FIG. 8. Whereas chunk 705 of FIG. 7 may be in data format 805-1 of FIG. 8, transformed chunk 810 of FIG. 8 may be in data format 805-2 of FIG. 8.

Finally, at block 915, sparse transformation circuit 140 of FIG. 1 may deliver transformed chunk 810 of FIG. 8 to a destination. The destination may be, for example, processor 110 of FIG. 1, storage device 120 of FIG. 1, or accelerator 135 of FIG. 1, among various possibilities.

FIG. 10 shows a flowchart of an example procedure for using sparse transformation circuit 140 of FIG. 1 to receive instructions for transforming chunk 705 of FIG. 7, according to embodiments of the disclosure. In FIG. 10, at block 1005, sparse transformation circuit 140 of FIG. 1 may download instructions into storage 540 of FIG. 5 to transform chunk 705 of FIG. 7 into transformed chunk 810 of FIG. 8. Note that if sparse transformation circuit 140 of FIG. 1 already has pre-installed instructions to transform chunk 705 of FIG. 7 into transformed chunk 810 of FIG. 8, then block 1005 may be omitted.

FIG. 11 shows a flowchart of an example procedure for sparse transformation circuit 140 of FIG. 1 to schedule chunks 705 of FIG. 7 for transformation, according to embodiments of the disclosure. In FIG. 11, at block 1105, sparse transformation circuit 140 of FIG. 1 may receive list of chunks 510 of FIG. 5. List of chunks 510 of FIG. 5 may be received from, for example, processor 110 of FIG. 1, storage device 120 of FIG. 1, or accelerator 135 of FIG. 1, among various possibilities. At block 1110, scheduler 515 of FIG. 5 may use list of chunks 510 of FIG. 5 to schedule the transformation of chunks 705 of FIG. 7 using transformation units 520 of FIG. 5.

Figure 12:
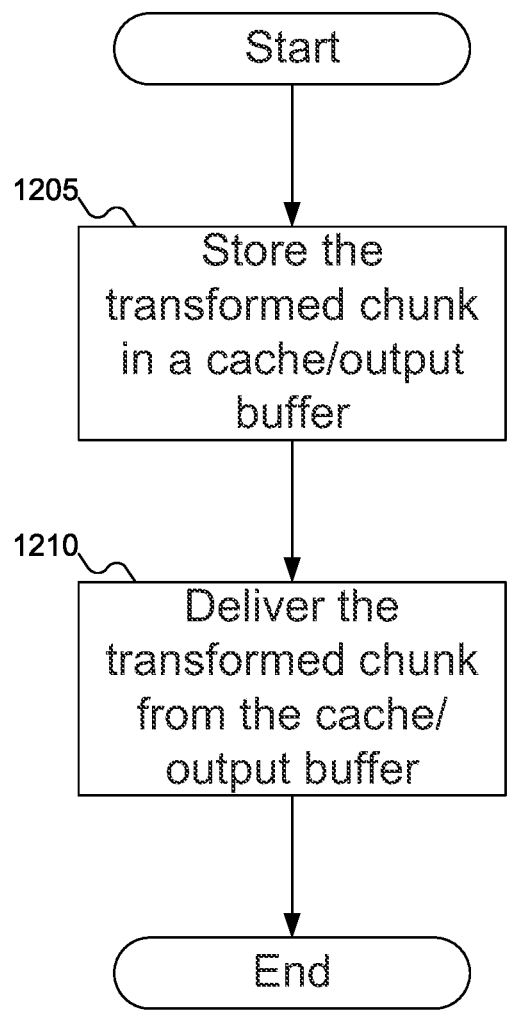
FIG. 12 shows a flowchart of an example procedure for the sparse transformation circuit of FIG. 1 to deliver the transformed chunk of FIG. 8 to a destination, according to embodiments of the disclosure.

FIG. 12 shows a flowchart of an example procedure for sparse transformation circuit 140 of FIG. 1 to deliver transformed chunk 810 of FIG. 8 to a destination, according to embodiments of the disclosure. In FIG. 12, at block 1205, sparse transformation circuit 140 of FIG. 1 may store transformed chunk 810 of FIG. 8 in output buffer 525 of FIG. 5 or cache 530 of FIG. 5. Finally, at block 1210, transmitter 535 of FIG. 5 may deliver transformed chunk 810 of FIG. 8 to its destination: for example, processor 110 of FIG. 1, storage device 120 of FIG. 1, or accelerator 135 of FIG. 1, among various possibilities.

In FIGS. 9-12, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may have a sparse transformation circuit. The sparse transformation circuit may support transforming sparse data from one format to another. Embodiments of the disclosure offer a technical advantage by supporting storage and processing of the data in different formats: the data may be stored in a format that is considered best for storage of the data, but may be processed in another format that is considered best for processing of the data.

In the era of big data, a large number of applications, including graph processing, machine learning, data mining, and computational fluid dynamics, are using large sparse datasets. Storage today may be heterogenous: different storage devices may be used in storage solutions. For an efficient storage and computation, sparse data may be stored in a compressed format that avoids storing the zeros partially or fully. There are numerous sparse formats to store a sparse tensor compactly. Choosing an optimal sparse format for an application may depend on several factors, including the density of the non-zeros, the sparsity pattern (how non-zeros are distributed in the tensor), the memory access pattern of the application, and the hardware performing the computation. Thus, there is no single sparse format that might perform optimally for all scenarios and applications.

Sparse application performance may vary for different sparse formats. In addition, a sparse format that is optimal for storage might not perform efficiently for a particular sparse computation.

For the best performance and energy efficiency, it is desirable to choose the sparse format based on the sparse operations and the inputs. However, this is challenging, since applications usually perform multiple operations on sparse data and it is hard to choose one sparse format that may perform optimally for all these operations. In addition, supporting multiple sparse formats for an application may require a lot of engineering effort. Hence, most of the time, the offloaded kernel might support one or very limited number of sparse formats.

One standard solution to support various sparse formats is to perform a preprocessing step to transform the input from its original format to the optimal sparse format before performing the sparse computation. This approach has two disadvantages. First, the preprocessing is a memory intensive task and exhibits many irregular memory accesses and thus it may introduce excessive performance and energy consumption overheads. Second, the inputs of sparse computation may frequently change for each program execution. Hence, the preprocessing may need to be performed repeatedly for each input. Thus, for performance and energy efficiency reasons, it is important to support an efficient and high performance solution to perform the sparse transformation to overcome the sparse transformation overheads.

Embodiments of the disclosure below use the example of a sparse matrix-vector multiplication (SpMV) kernel to explain different concepts of embodiments of the disclosure. However, proposed ideas are not limited to any specific sparse kernel or any particular sparse format.

The sparse input matrix may be stored in a conventional coordinate format (COO) format on the storage. The COO format may store the non-zero elements (values) along with their coordinates (i.e., row and column indices). The COO format may be useful for incremental matrix construction and thus may be used to import the sparse data. The SpMV computation may be accelerated with a Graphics Processing Unit (GPU). For example, the performance of SpMV running on a GPU may be faster (for example, twice as fast) if a compressed sparse row (CSR) format is used rather than COO format. To allow the GPU to use CSR format instead, the sparse input may be transformed from COO to CSR format. Embodiments of the disclosure may offload the transformation (from COO to CSR) to the computation unit inside the storage device.

The compute unit (compute engine) inside the storage may transform the sparse input from COO format to the desired format (CSR) and the GPU may perform the sparse computation (SpMV in this example).

Embodiments of the disclosure may enable the storage device to directly communicate the reformatted sparse data to the compute engine that perform the sparse kernel. Embodiments of the disclosure may enable the storage to communicate the result partially with the accelerator to allow overlapping their execution times. To enable this feature, embodiments of the disclosure may include various features.

(a) First, the sparse input data may be partitioned into multiple smaller chunks. Each chunk may be processed independently by the storage device and the accelerator performing the sparse kernel. The data chunking may be performed in two general ways. The first approach may be to determine a fixed size for the chunk. For example, for a sparse input in the form of a matrix, each chunk may include certain number of rows in the matrix (e.g., 100 rows of the data in each chunk). The second approach may be to allow chunks to be of different size. For example, one chunk might include 100 rows of the matrix, while another the other chunk might include 200 rows. The second approach may be useful when the distribution of the non-zero elements in the data is not even (i.e., irregular data distribution).

(b) To overlap the sparse transformation and the sparse computation, the two units may process different set of chunks at each point of time. After the initial round, the GPU may perform SpMV computation on the first preprocessed chunk, while the storage device may start sparse transformation on the second chunk. For communication between the two units, an intermediate buffer may function as a ping-pong buffer between the computation unit on the storage and the accelerator. The storage device may write the result of sparse transformation into the buffers, while the accelerator may read the result from another buffer.

(c) Sparse kernels may sometime exhibit unpredictable memory access patterns. To accommodate that, the sparse transformer may receive a list of requested chunks from the accelerator and may schedule the sparse transformation on the sparse input based on the order the chunks are accessed by the accelerator.

(d) To improve the performance of the sparse transformation, the result of the sparse transformation may be stored in a dedicated cache on the storage device to serve future requests. In this way, embodiments of the disclosure may access the storage to read the result sparse format only if they do not already exist in the cache. Embodiments of the disclosure may include a write-through cache (which means the result data may be written to both cache and SSD). The write through cache method may avoid incurring any extra overhead since the cached data may be read-only from the accelerator point of view. The size of the cache, the replacement policy, and other information may be set decided based on the application access pattern and available resources on the device.

(e) An example internal architecture of the sparse transformer that may be offloaded to the storage device may include units that enable serving multiple chunks in parallel. Each unit may process a different request chunk (in this example there are four units, but other numbers may also be supported). The design includes a scheduler that schedules the requested chunks among the available units. The output of each unit may be sent to the cache management unit. The cache management unit may manage the cache and write the result to the SSD.

Embodiments of the disclosure may support multiple sparse transformations. To achieve that, the sparse transform unit may be extensible (reconfigured if, for example, a Field Programmable Gate Array (FPGA) is used). As an example, suppose another accelerator were to be used rather than a GPU (e.g., a Tensor Processing Unit (TPU)) to perform the SpMV computation. If the new hardware performs well using a different sparse format (e.g., not the CSR). In this way, embodiments of the disclosure are not limited to one or a few sparse formats. Another possible use case is when the sparsity pattern of the input data favors a particular sparse format. For example, if all the non-zero elements are scattered around the diagonal, the Diagonal sparse format (DIA) may perform better than CSR. Using embodiments of the disclosure enables seamless transformation of the data from the available sparse format to the desired format based on the application need. In addition, the sparse format transformation may be extensible, and additional transformations may be supported.

Embodiments of the disclosure may support N-dimensional sparse tensors including 1D (i.e., vector), 2D (i.e., matrix), etc. The transformation engine may be designed as software (for example, running on the SSD controller) or as a hardware feature including an FPGA, an Application-Specific Integrated Circuit (ASIC), etc. The sparse transformation may be applied to input as well as to output of any sparse computation.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a transformation circuit, comprising:

a receiver to receive a chunk using a first data format from a source;

a transformation unit to transform the chunk into a transformed chunk, the transformed chunk using a second data format; and a transmitter to deliver the transformed chunk to a destination.

Statement 2. An embodiment of the disclosure includes the transformation circuit according to statement 1, wherein the transformation circuit is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), a network interface card (NIC), or a system-on-a-chip (SoC).

Statement 3. An embodiment of the disclosure includes the transformation circuit according to statement 1, wherein the transformation circuit includes software executable by a processor.

Statement 4. An embodiment of the disclosure includes the transformation circuit according to statement 3, wherein the processor includes a controller of a storage device, the storage device including a storage, the controller configured to process a request to access the storage.

Statement 5. An embodiment of the disclosure includes the transformation circuit according to statement 1, wherein the source includes a host processor, a storage device, or an accelerator.

Statement 6. An embodiment of the disclosure includes the transformation circuit according to statement 1, wherein the destination includes a host processor, a storage device, or an accelerator.

Statement 7. An embodiment of the disclosure includes the transformation circuit according to statement 1, further comprising a storage for instructions to transform the chunk into the transformed chunk.

Statement 8. An embodiment of the disclosure includes the transformation circuit according to statement 7, wherein the transformation circuit is configured to download the instructions to transform the chunk into the transformed chunk.

Statement 9. An embodiment of the disclosure includes the transformation circuit according to statement 1, wherein the first data format is one of at least the first data format and a third data format.

Statement 10. An embodiment of the disclosure includes the transformation circuit according to statement 1, wherein the second data format is one of at least the second data format and a third data format.

Statement 11. An embodiment of the disclosure includes the transformation circuit according to statement 1, wherein the chunk includes a vector, a matrix, or a multidimension tensor.

Statement 12. An embodiment of the disclosure includes the transformation circuit according to statement 1, wherein the transformation unit is configured to transform the chunk into an intermediate chunk using a third data format, and to transform the intermediate chunk into the transformed chunk using the second data format.

Statement 13. An embodiment of the disclosure includes the transformation circuit according to statement 1, wherein a storage device includes the transformation circuit, the storage device including a storage and a controller to process a request to access the storage.

Statement 14. An embodiment of the disclosure includes the transformation circuit according to statement 1, wherein:

the receiver is configured to receive a second chunk, the second chunk using the first data format;

the transformation circuit further comprises a second transformation unit to transform the second chunk into a second transformed chunk, the second transformed chunk using the second data format; and the transmitter is configured to deliver the second transformed chunk to the destination.

Statement 15. An embodiment of the disclosure includes the transformation circuit according to statement 14, further comprising a scheduler to schedule the chunk with the transformation unit and the second chunk with the second transformation unit.

Statement 16. An embodiment of the disclosure includes the transformation circuit according to statement 1, further comprising a scheduler to schedule the chunk and a second chunk for transformation.

Statement 17. An embodiment of the disclosure includes the transformation circuit according to statement 16, wherein the receiver is configured to receive a list of chunks to transform, the list of chunks identifying the chunk and the second chunk.

Statement 18. An embodiment of the disclosure includes the transformation circuit according to statement 17, wherein the receiver is configured to receive the list of chunks from a host processor or an accelerator.

Statement 19. An embodiment of the disclosure includes the transformation circuit according to statement 16, wherein the chunk includes a first size and the second chunk includes a second size.

Statement 20. An embodiment of the disclosure includes the transformation circuit according to statement 19, wherein the first size and the second size are the same.

Statement 21. An embodiment of the disclosure includes the transformation circuit according to statement 19, wherein the first size is different from the second size.

Statement 22. An embodiment of the disclosure includes the transformation circuit according to statement 16, wherein the receiver is configured to receive the chunk and the second chunk.

Statement 23. An embodiment of the disclosure includes the transformation circuit according to statement 22, wherein the receiver is configured to receive the chunk and the second chunk based at least in part on a list of chunks, the list of chunks identifying the chunk and the second chunk.

Statement 24. An embodiment of the disclosure includes the transformation circuit according to statement 22, wherein the receiver is configured to receive the chunk and the second chunk from a host processor, a storage device, or an accelerator.

Statement 25. An embodiment of the disclosure includes the transformation circuit according to statement 1, further comprising a cache.

Statement 26. An embodiment of the disclosure includes the transformation circuit according to statement 25, wherein the cache is configured to buffer the transformed chunk.

Statement 27. An embodiment of the disclosure includes the transformation circuit according to statement 26, wherein the cache is configured to buffer the transformed chunk until the transformed chunk is delivered by the transmitter.

Statement 28. An embodiment of the disclosure includes the transformation circuit according to statement 26, wherein the cache is configured to buffer the transformed chunk for later use.

Statement 29. An embodiment of the disclosure includes the transformation circuit according to statement 26, wherein the transmitter is configured to deliver the transformed chunk from the cache.

Statement 30. An embodiment of the disclosure includes the transformation circuit according to statement 1, further comprising an output buffer.

Statement 31. An embodiment of the disclosure includes the transformation circuit according to statement 30, wherein the transmitter is configured to deliver the transformed chunk from the output buffer.

Statement 32. An embodiment of the disclosure includes the transformation circuit according to statement 1, wherein the transmitter is configured to deliver the transformed chunk from the transformation unit.

Statement 33. An embodiment of the disclosure includes a system, comprising:
a host processor;
a storage device, the storage device including:
a storage; and
a controller to process a request to access the storage; and
a transformation circuit to transform a data from a first data format to a second data format.

Statement 34. An embodiment of the disclosure includes the system according to statement 33, wherein the transformation circuit is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), a network interface card (NIC), or a system-on-a-chip (SoC).

Statement 35. An embodiment of the disclosure includes the system according to statement 33, wherein:
the system further comprises an accelerator (135);
the storage stores the data in the first data format; and
the accelerator uses the data in the second data format.

Statement 36. An embodiment of the disclosure includes the system according to statement 35, wherein the transformation circuit is configured to load the data in the first data format from the storage device and to deliver the data in the second data format to the accelerator.

Statement 37. An embodiment of the disclosure includes the system according to statement 33, wherein:
the system further comprises an accelerator (135);
the storage stores the data in the second data format; and
the accelerator uses the data in the first data format.

Statement 38. An embodiment of the disclosure includes the system according to statement 37, wherein the transformation circuit is configured to receive the data in the first data format from the accelerator and to store the data in second data format on the storage device.

Statement 39. An embodiment of the disclosure includes the system according to statement 33, wherein the transformation circuit includes storage for instructions to transform the data from the first data format to the second data format.

Statement 40. An embodiment of the disclosure includes the system according to statement 33, wherein the transformation circuit includes storage for pre-installed instructions to transform the data from the first data format to the second data format.

Statement 41. An embodiment of the disclosure includes the system according to statement 33, wherein the first data format is one of at least the first data format and a third data format.

Statement 42. An embodiment of the disclosure includes the system according to statement 33, wherein the second data format is one of at least the second data format and a third data format.

Statement 43. An embodiment of the disclosure includes the system according to statement 33, wherein the transformation circuit is configured to transform the chunk into an intermediate chunk using a third data format, and to transform the intermediate chunk into the transformed chunk using the second data format.

Statement 44. An embodiment of the disclosure includes the system according to statement 33, wherein the storage device includes at least one of an accelerator and the transformation circuit.

Statement 45. An embodiment of the disclosure includes the system according to statement 33, wherein controller includes the transformation circuit.

Statement 46. An embodiment of the disclosure includes the system according to statement 45, wherein the transformation circuit includes software executable by the controller.

Statement 47. An embodiment of the disclosure includes the system according to statement 33, wherein the chunk includes a vector, a matrix, or a multidimension tensor.

Statement 48. An embodiment of the disclosure includes the system according to statement 33, wherein the transformation circuit includes:
a first transformation unit; and
a second transformation unit.

Statement 49. An embodiment of the disclosure includes the system according to statement 48, wherein:
the first transformation unit is configured to transform a first chunk from the first data format to the second data format; and
the second transformation unit is configured to transform a second chunk from the first data format to the second data format.

Statement 50. An embodiment of the disclosure includes the system according to statement 48, wherein the transformation circuit further includes a scheduler to schedule a first chunk with the first transformation unit and a second chunk with the second transformation unit.

Statement 51. An embodiment of the disclosure includes the system according to statement 33, wherein the transformation circuit further includes a scheduler to schedule a first chunk and a second chunk for transformation.

Statement 52. An embodiment of the disclosure includes the system according to statement 51, wherein the transformation circuit includes a list of chunks to transform, the list of chunks identifying the first chunk and the second chunk.

Statement 53. An embodiment of the disclosure includes the system according to statement 52, wherein the transformation circuit includes a receiver to receive the list of chunks to transform.

Statement 54. An embodiment of the disclosure includes the system according to statement 53, wherein the receiver is configured to receive the list of chunks from the host processor, the storage device, or an accelerator.

Statement 55. An embodiment of the disclosure includes the system according to statement 52, wherein the transformation circuit is configured to receive the list of chunks from the host processor, the storage device, or an accelerator.

Statement 56. An embodiment of the disclosure includes the system according to statement 51, wherein the first chunk includes a first size and the second chunk includes a second size.

Statement 57. An embodiment of the disclosure includes the system according to statement 56, wherein the first size and the second size are the same.

Statement 58. An embodiment of the disclosure includes the system according to statement 56, wherein the first size is different from the second size.

Statement 59. An embodiment of the disclosure includes the system according to statement 51, further comprising a receiver is configured to receive the first chunk and the second chunk.

Statement 60. An embodiment of the disclosure includes the system according to statement 59, wherein the receiver is configured to receive the first chunk and the second chunk from the host processor, the storage device, or an accelerator.

Statement 61. An embodiment of the disclosure includes the system according to statement 33, wherein the transformation circuit includes a cache.

Statement 62. An embodiment of the disclosure includes the system according to statement 61, wherein cache is configured to buffer a transformed chunk.

Statement 63. An embodiment of the disclosure includes the system according to statement 62, wherein the cache is configured to buffer the transformed chunk until the transformed chunk is sent from the transformation circuit.

Statement 64. An embodiment of the disclosure includes the system according to statement 62, wherein the cache is configured to buffer the transformed chunk for later use.

Statement 65. An embodiment of the disclosure includes the system according to statement 33, wherein the transformation circuit includes a transmitter.

Statement 66. An embodiment of the disclosure includes the system according to statement 65, wherein the transmitter is configured to deliver a transformed chunk.

Statement 67. An embodiment of the disclosure includes the system according to statement 66, wherein the transmitter is configured to access the transformed chunk from a cache.

Statement 68. An embodiment of the disclosure includes the system according to statement 66, wherein the transmitter is configured to access the transformed chunk from an output buffer.

Statement 69. An embodiment of the disclosure includes the system according to statement 66, wherein the transmitter is configured to receive the transformed chunk from a transformation unit.

Statement 70. An embodiment of the disclosure includes the system according to statement 66, wherein the transmitter is configured to deliver the transformed chunk to the storage device or an accelerator.

Statement 71. An embodiment of the disclosure includes a method, comprising:
receiving a chunk at a transformation circuit from a source, the chunk using a first data format;
transforming the chunk into a transformed chunk, the transformed chunk using a second data format; and
delivering the transformed chunk from the transformation circuit to a destination.

Statement 72. An embodiment of the disclosure includes the method according to statement 71, wherein the transformation circuit is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), a network interface card (NIC), or a system-on-a-chip (SoC).

Statement 73. An embodiment of the disclosure includes the method according to statement 71, wherein the transformation circuit includes software executable by a processor.

Statement 74. An embodiment of the disclosure includes the method according to statement 73, wherein the processor includes a controller of a storage device, the storage device including a storage, the controller configured to process a request to access the storage.

Statement 75. An embodiment of the disclosure includes the method according to statement 71, wherein receiving the chunk at the transformation circuit from the source includes receiving the chunk at the transformation circuit from a host processor, a storage device, or an accelerator.

Statement 76. An embodiment of the disclosure includes the method according to statement 71, wherein delivering the transformed chunk from the transformation circuit to the destination includes delivering the transformed chunk from the transformation circuit to a host processor, a storage device, or an accelerator.

Statement 77. An embodiment of the disclosure includes the method according to statement 71, further comprising downloading instructions to transform the chunk into the transformed chunk.

Statement 78. An embodiment of the disclosure includes the method according to statement 77, wherein downloading instructions to transform the chunk into the transformed chunk includes downloading instructions to transform the chunk into the transformed chunk from a host processor, a storage device, or an accelerator.

Statement 79. An embodiment of the disclosure includes the method according to statement 71, wherein the first data format is one of at least the first data format and a third data format.

Statement 80. An embodiment of the disclosure includes the method according to statement 71, wherein the second data format is one of at least the second data format and a third data format.

Statement 81. An embodiment of the disclosure includes the method according to statement 71, wherein transforming the chunk into the transformed chunk includes:
transforming the chunk into an intermediate chunk using a third data format; and
transforming the intermediate chunk into the transformed chunk using the second data format.

Statement 82. An embodiment of the disclosure includes the method according to statement 71, wherein the chunk includes a vector, a matrix, or a multidimension tensor.

Statement 83. An embodiment of the disclosure includes the method according to statement 71, wherein:
receiving the chunk at the transformation circuit from the source includes receiving the chunk and a second chunk at the transformation circuit from the source, the second chunk using the first data format;
the method further comprises transforming the second chunk into a second transformed chunk, the second transformed chunk using the second data format; and
delivering the transformed chunk from the transformation circuit to the destination includes delivering the transformed chunk and the second transformed chunk from the transformation circuit to the destination.

Statement 84. An embodiment of the disclosure includes the method according to statement 83, further comprising scheduling the chunk and the second chunk for transformation.

Statement 85. An embodiment of the disclosure includes the method according to statement 84, wherein scheduling the chunk and the second chunk for transformation includes:
scheduling the chunk for transformation with a first transformation unit; and
scheduling the second chunk for transformation with a second transformation unit.

Statement 86. An embodiment of the disclosure includes the method according to statement 83, wherein receiving the chunk and the second chunk at the transformation circuit from the source includes receiving a list of chunks to transform, the list of chunks identifying the chunk and the second chunk.

Statement 87. An embodiment of the disclosure includes the method according to statement 86, wherein receiving the list of chunks to transform includes receiving the list of chunks to transform from a host processor or an accelerator.

Statement 88. An embodiment of the disclosure includes the method according to statement 83, wherein the chunk includes a first size and the second chunk includes a second size.

Statement 89. An embodiment of the disclosure includes the method according to statement 88, wherein the first size and the second size are the same.

Statement 90. An embodiment of the disclosure includes the method according to statement 88, wherein the first size is different from the second size.

Statement 91. An embodiment of the disclosure includes the method according to statement 83, wherein receiving the chunk and the second chunk at the transformation circuit from the source includes receiving the chunk and the second chunk at the transformation circuit from the source based at least in part on a list of chunks, the list of chunks identifying the chunk and the second chunk.

Statement 92. An embodiment of the disclosure includes the method according to statement 71, further comprising storing the transformed chunk in a cache.

Statement 93. An embodiment of the disclosure includes the method according to statement 92, wherein delivering the transformed chunk from the transformation circuit to the destination includes accessing the transformed chunk from the cache.

Statement 94. An embodiment of the disclosure includes the method according to statement 92, wherein transforming the chunk into the transformed chunk includes transforming the chunk into the transformed chunk based at least in part on whether the transformed chunk is in the cache.

Statement 95. An embodiment of the disclosure includes the method according to statement 92, further comprising storing the transformed chunk in the cache until the transformed chunk is transmitted to the destination.

Statement 96. An embodiment of the disclosure includes the method according to statement 92, further comprising storing the transformed chunk for later use.

Statement 97. An embodiment of the disclosure includes the method according to statement 71, further comprising storing the transformed chunk in an output buffer.

Statement 98. An embodiment of the disclosure includes the method according to statement 97, wherein delivering the transformed chunk from the transformation circuit to the destination includes accessing the transformed chunk from the output buffer.

Statement 99. An embodiment of the disclosure includes the method according to statement 98, further comprising storing the transformed chunk in the output buffer until the transformed chunk is transmitted to the destination.

Statement 100. An embodiment of the disclosure includes the method according to statement 71, wherein:

transforming the chunk into the transformed chunk includes transforming the chunk into the transformed chunk using a transformation unit; and delivering the transformed chunk from the transformation circuit to the destination includes receiving the transformed chunk from the transformation unit.

Statement 101. An embodiment of the disclosure includes an article, comprising a non-transitory storage medium, the non-transitory storage medium having stored thereon instructions that, when executed by a machine, result in:

receiving a chunk at a transformation circuit from a source, the chunk using a first data format;

transforming the chunk into a transformed chunk, the transformed chunk using a second data format; and delivering the transformed chunk from the transformation circuit to a destination.

Statement 102. An embodiment of the disclosure includes the article according to statement 101, wherein the transformation circuit is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), a network interface card (NIC), or a system-on-a-chip (SoC).

Statement 103. An embodiment of the disclosure includes the article according to statement 101, wherein the transformation circuit includes software executable by a processor.

Statement 104. An embodiment of the disclosure includes the article according to statement 103, wherein the processor includes a controller of a storage device, the storage device including a storage, the controller configured to process a request to access the storage.

Statement 105. An embodiment of the disclosure includes the article according to statement 101, wherein receiving the chunk at the transformation circuit from the source includes receiving the chunk at the transformation circuit from a host processor, a storage device, or an accelerator.

Statement 106. An embodiment of the disclosure includes the article according to statement 101, wherein delivering the transformed chunk from the transformation circuit to the destination includes delivering the transformed chunk from the transformation circuit to a host processor, a storage device, or an accelerator.

Statement 107. An embodiment of the disclosure includes the article according to statement 101, the non-transitory storage medium having stored thereon further instructions that, when executed by the machine, result in downloading instructions to transform the chunk into the transformed chunk.

Statement 108. An embodiment of the disclosure includes the article according to statement 107, wherein downloading instructions to transform the chunk into the transformed chunk includes downloading instructions to transform the chunk into the transformed chunk from a host processor, a storage device, or an accelerator.

Statement 109. An embodiment of the disclosure includes the article according to statement 101, wherein the first data format is one of at least the first data format and a third data format.

Statement 110. An embodiment of the disclosure includes the article according to statement 101, wherein the second data format is one of at least the second data format and a third data format.

Statement 111. An embodiment of the disclosure includes the article according to statement 101, wherein transforming the chunk into the transformed chunk includes:

transforming the chunk into an intermediate chunk using a third data format; and transforming the intermediate chunk into the transformed chunk using the second data format.

Statement 112. An embodiment of the disclosure includes the article according to statement 101, wherein the chunk includes a vector, a matrix, or a multidimension tensor.

Statement 113. An embodiment of the disclosure includes the article according to statement 101, wherein:

receiving the chunk at the transformation circuit from the source includes receiving the chunk and a second chunk at the transformation circuit from the source, the second chunk using the first data format;

the non-transitory storage medium has stored thereon further instructions that, when executed by the machine, result in transforming the second chunk into a second transformed chunk, the second transformed chunk using the second data format; and delivering the transformed chunk from the transformation circuit to the destination includes delivering the transformed chunk and the second transformed chunk from the transformation circuit to the destination.

Statement 114. An embodiment of the disclosure includes the article according to statement 113, the non-transitory storage medium having stored thereon further instructions that, when executed by the machine, result in scheduling the chunk and the second chunk for transformation.

Statement 115. An embodiment of the disclosure includes the article according to statement 114, wherein scheduling the chunk and the second chunk for transformation includes:
  scheduling the chunk for transformation with a first transformation unit; and
  scheduling the second chunk for transformation with a second transformation unit.

Statement 116. An embodiment of the disclosure includes the article according to statement 113, wherein receiving the chunk and the second chunk at the transformation circuit from the source includes receiving a list of chunks to transform, the list of chunks identifying the chunk and the second chunk.

Statement 117. An embodiment of the disclosure includes the article according to statement 116, wherein receiving the list of chunks to transform includes receiving the list of chunks to transform from a host processor or an accelerator.

Statement 118. An embodiment of the disclosure includes the article according to statement 113, wherein the chunk includes a first size and the second chunk includes a second size.

Statement 119. An embodiment of the disclosure includes the article according to statement 118, wherein the first size and the second size are the same.

Statement 120. An embodiment of the disclosure includes the article according to statement 118, wherein the first size is different from the second size.

Statement 121. An embodiment of the disclosure includes the article according to statement 113, wherein receiving the chunk and the second chunk at the transformation circuit from the source includes receiving the chunk and the second chunk at the transformation circuit from the source based at least in part on a list of chunks, the list of chunks identifying the chunk and the second chunk.

Statement 122. An embodiment of the disclosure includes the article according to statement 101, the non-transitory storage medium having stored thereon further instructions that, when executed by the machine, result in storing the transformed chunk in a cache.

Statement 123. An embodiment of the disclosure includes the article according to statement 122, wherein delivering the transformed chunk from the transformation circuit to the destination includes accessing the transformed chunk from the cache.

Statement 124. An embodiment of the disclosure includes the article according to statement 122, wherein transforming the chunk into the transformed chunk includes transforming the chunk into the transformed chunk based at least in part on whether the transformed chunk is in the cache.

Statement 125. An embodiment of the disclosure includes the article according to statement 122, the non-transitory storage medium having stored thereon further instructions that, when executed by the machine, result in storing the transformed chunk in the cache until the transformed chunk is transmitted to the destination.

Statement 126. An embodiment of the disclosure includes the article according to statement 122, the non-transitory storage medium having stored thereon further instructions that, when executed by the machine, result in storing the transformed chunk for later use.

Statement 127. An embodiment of the disclosure includes the article according to statement 101, the non-transitory storage medium having stored thereon further instructions that, when executed by the machine, result in storing the transformed chunk in an output buffer.

Statement 128. An embodiment of the disclosure includes the article according to statement 127, wherein delivering the transformed chunk from the transformation circuit to the destination includes accessing the transformed chunk from the output buffer.

Statement 129. An embodiment of the disclosure includes the article according to statement 128, the non-transitory storage medium having stored thereon further instructions that, when executed by the machine, result in 'storing the transformed chunk in the output buffer until the transformed chunk is transmitted to the destination.

Statement 130. An embodiment of the disclosure includes the article according to statement 101, wherein:
  transforming the chunk into the transformed chunk includes transforming the chunk into the transformed chunk using a transformation unit; and
  delivering the transformed chunk from the transformation circuit to the destination includes receiving the transformed chunk from the transformation unit.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device, comprising:
  a receiver to receive a portion of a data using a first sparse data format from a source device;
  a transformation circuit to transform the portion of the data into a transformed portion of the data, the transformed portion of the data using a second sparse data format; and
  a transmitter to deliver the transformed portion of the data to a destination device,
  wherein the first sparse data format is different from the second sparse data format;
  wherein the source device is different from the destination device; and
  wherein the transformation circuit is configured to transform the portion of the data in the first sparse data format into the transformed portion of the data in the second sparse data format so that the destination device may process the transformed portion of the data.

2. The device according to claim 1, wherein the first sparse data format is one of at least the first sparse data format and a third sparse data format.

3. The device according to claim 1, wherein the second sparse data format is one of at least the second sparse data format and a third sparse data format.

4. The device according to claim 1, wherein the portion of the data includes a vector, a matrix, or a multidimension tensor.

5. The device according to claim 1, wherein:
the receiver is configured to receive a second portion of the data, the second portion of the data using the first sparse data format;
the device further comprises a second transformation circuit to transform the second portion of the data into a second transformed portion of the data, the second transformed portion of the data using the second sparse data format; and
the transmitter is configured to deliver the second transformed portion of the data to the destination device.

6. The device according to claim 1, further comprising a scheduler to schedule the portion of the data and a second portion of the data for transformation.

7. The device according to claim 1, further comprising a cache to buffer the transformed portion of the data.

8. The device according to claim 1, wherein the destination device is configured to process the transformed portion of the data.

9. A system, comprising:
a host processor to issue a request;
a storage device, the storage device including:
  a storage, the storage including a portion of a data in a first sparse data format; and
  a controller to process a request to access the storage; and
an accelerator, the accelerator using the portion of the data in a second sparse data format; and
a device to transform the portion of the data from the first sparse data format to the second sparse data format based at least in part on the request,
wherein the first sparse data format is different from the second sparse data format;
wherein the storage device is different from the accelerator; and
wherein the device is configured to transform the portion of the data in the first sparse data format into the transformed portion of the data in the second sparse data format so that the accelerator may process the transformed portion of the data.

10. The system according to claim 9, wherein the device includes storage for instructions to transform the portion of the data from the first sparse data format to the second sparse data format.

11. The system according to claim 9, wherein the portion of the data includes a vector, a matrix, or a multidimension tensor.

12. The system according to claim 9, wherein the device includes:
a first transformation circuit to transform a first portion of the data from the first sparse data format to the second sparse data format; and
a second transformation circuit to transform a second portion of the data from the first sparse data format to the second sparse data format.

13. The system according to claim 9, wherein the device further includes a scheduler to schedule a first portion of the data and a second portion of the data for transformation.

14. The system according to claim 13, wherein the device includes a list of portions to transform, the list of portions identifying the first portion of the data and the second portion of the data.

15. The system according to claim 13, further comprising a receiver is configured to receive the first portion of the data and the second portion of the data.

16. The system according to claim 9, wherein the device includes a cache to buffer the transformed portion of the data.

17. A method, comprising:
receiving a portion of a data at a device from a source device, the portion of the data using a first sparse data format;
transforming the portion of the data into a transformed portion of the data, the transformed portion of the data using a second sparse data format; and
delivering the transformed portion of the data from the device to a destination device,
wherein the first sparse data format is different from the second sparse data format;
wherein the source device is different from the destination device; and
wherein the portion of the data in the first sparse data format is transformed into the transformed portion of the data in the second sparse data format so that the destination device may process the transformed portion of the data.

18. The method according to claim 17, wherein:
receiving the portion of the data at the device from the source device includes receiving the portion of the data and a second portion of the data at the device from the source device, the second portion using the first sparse data format;
the method further comprises transforming the second portion of the data into a second transformed portion of the data, the second transformed portion of the data using the second sparse data format; and
delivering the transformed portion of the data from the device to the destination device includes delivering the transformed portion of the data and the second transformed portion of the data from the device to the destination device.

19. The method according to claim 18, further comprising scheduling the portion of the data and the second portion of the data for transformation.

20. The method according to claim 19, wherein scheduling the portion of the data and the second portion of the data for transformation includes:
scheduling the portion of the data for transformation with a first transformation circuit; and
scheduling the second portion of the data for transformation with a second transformation circuit.

21. The method according to claim 17, further comprising storing the transformed portion of the data in a cache.

* * * * *